July 10, 1956 C. W. OHM 2,754,166
BAR-TYPE ROTARY SERVER
Filed May 3, 1954

Chauncey W. Ohm
INVENTOR.

BY
Attorneys

United States Patent Office 2,754,166
Patented July 10, 1956

2,754,166

BAR-TYPE ROTARY SERVER

Chauncey W. Ohm, Watertown, Wis.

Application May 3, 1954, Serial No. 426,983

2 Claims. (Cl. 312—140.4)

The present invention relates to a novel server attachment for use on and in combination with a bar in a tavern, saloon, one's home, or elsewhere, the same being, obviously, designed to serve the needs of a bartender or other attendant, and therefore constituting a convenient aid for such persons.

More specifically, the invention has to do with a structurally novel and unique horizontally disposed turntable, the latter being provided, in one manner or another, with either removable or permanently attached receptacles or dishes functioning as handily available containers for olives, cherries, onions, orange slices, lemon slices, and similar ingredients such as are customarily needed in the preparation of cocktails and the making and serving of mixed drinks.

Briefly summarized, a preferred embodiment of the invention is characterized by a novel combination of an elongate horizontal bar having an unobstructed lengthwise inner edge providing the usual serving side from which an attendant, a bartender for example, stands and performs his customary duties, and a turntable mounted for rotation beneath said bar, said turntable having a segmental portion of a predetermined area constantly and accessibly projecting in a horizontal plane beyond said edge, said turntable having selectively usable individual receptacles for prescribed fruits, vegetables and similar ingredients usable in mixing and serving cocktails and so-called mixed drinks.

Another object of the invention is to provide a construction, as stated, wherein the turntable is preferably circular in plan, has a flat and easily available top surface and is accessibly suspended in a parallel plane below the bottom or underneath side of the bar.

In carrying out a preferred embodiment of the invention, the turntable is not only circular or discoidal in plan, it is of a diameter that approximately a one-quarter segmental or peripheral portion projects at all times from beneath the bar to an accessible position beyond the stated inner edge of the bar, said turntable being preferably provided with circumferentially spaced openings to accommodatingly receive insertable and removable so-called refrigerator-type dishes.

Then, too, novelty is predicated on the construction set forth in conjunction with refrigerating means, the latter being likewise mounted and suspended from beneath the bar and so constructed that it is in close proximity to and cooperates directly with the turntable, any suitable refrigerating means, such as coils, ice, or the like, being utilized to keep the contents of the dishes acceptably fresh.

Other objects, features and advantages will became more readily apparent from the following description and the accompanying sheet of illustrative drawings.

In the drawings, wherein like numerals are employed to designate like parts throughout the views.

Figure 1:
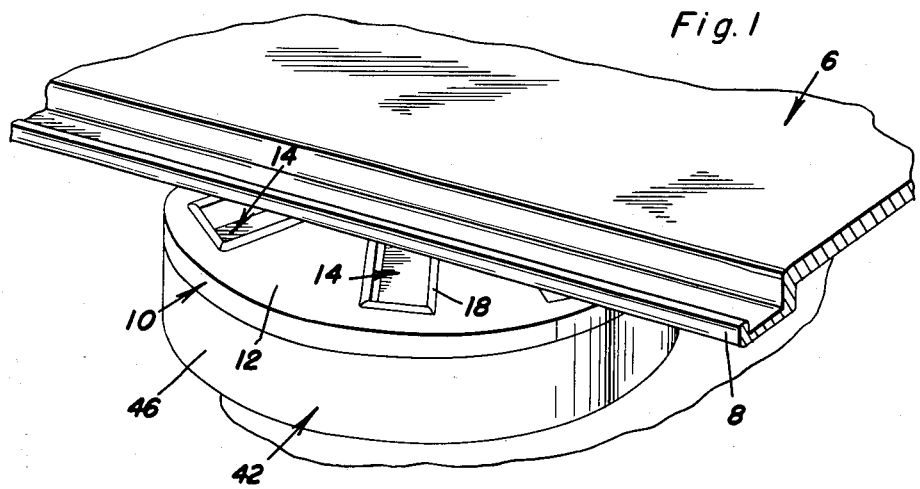
Figure 1 is a fragmentary perspective view showing a portion of a counter-type bar or shelf and the improved rotary bartender's server mounted for use thereon.
Figure 2:
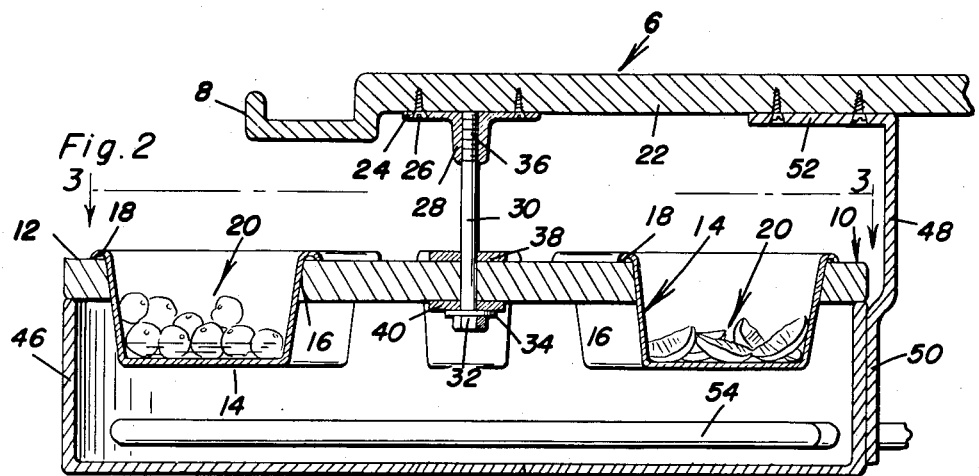
Figure 2 is an enlarged sectional view with parts in elevation illustrating the details and their construction and arrangement.
Figure 3:
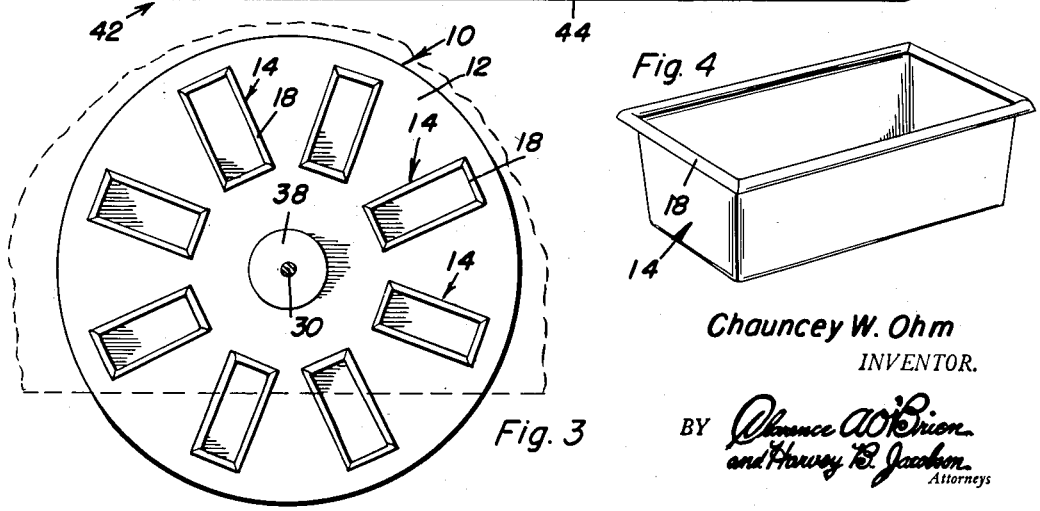
Figure 3 is a view on a smaller scale which may be said to be taken approximately on the plane of the line 3—3 of Figure 2 looking in the direction of the arrows.
Figure 4:
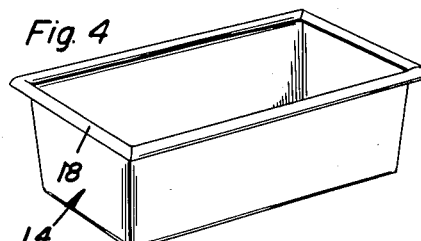
Figure 4 is a perspective view of one of the insertable and removable dishes or receptacles.

Referring now to the drawings with the aid of reference numerals and lead lines, the relatively stationary shelf or bar is denoted generally by the numeral 6, and this is of any suitable customary form, the inner longitudinal or lengthwise edge thereof being denoted at 8. The turntable is denoted generally by the numeral 10. Although this may be of some other form, it is preferably a wooden or equivalent circular plate or equivalent member whose top surface is preferably flat as at 12. In practice, this disc or plate is preferably some 18 inches in diameter. Turntable 10 may be rotatably mounted in various ways. Also, it may be, within the purview of the concept, made of moldable commercial plastic with the receptacles incorporated therein. Preferably, however, are provided a plurality of insertable and removable refrigerator-type dishes 14 of appropriate size and material and these are mounted in openings 16 provided therefor. The dishes may be tapered and the openings likewise tapered and the upper open portions of the dishes may be provided with outstanding rim-portions 18 to rest atop the turntable, as best shown in Figure 2. As before stated, these dishes are adapted to contain the various ingredients used in preparing and mixing cocktails and various kinds of drinks. The numeral 20 conveniently denotes the accessible ingredients in two of the tray-like receptacles in Figure 2. The turntable is suspended in such a way that the top is in spaced parallelism beneath the underside 22 of the bar. More specifically, a flange or equivalent plate 24 is provided and this is secured by screws or the like 26 to the underside 22 and it has a depending centrally disposed screw-threaded socket member 28. This serves to accommodate a shaft. The shaft may be a simple bolt 30 of appropriate length and diameter having a head 32 at the lower end and an associated end thrust washer 34. The upper end is screw-threaded as at 36 and this end is screwed into the socket member. The turntable has a central hole and it is mounted for free rotation on the headed end of the shaft or bolt, preferably between upper and lower weight distributing and free turning washers 38 and 40 which are shown surrounding the bolt and situated against the top and bottom surfaces of the turntable. Any suitable anti-friction bearing can, of course, be provided (not shown) to rotatably suspend the turntable from the bar. Because of the position of the shaft 30 and the diameter of the turntable, approximately one-quarter portion, more or less, constantly projects beyond the inner edge 8 so that there is always a limited portion of the turntable and one or more dishes available for convenience of use of the user, usually the bartender. The invention also contemplates the employment of refrigerating means. This is, however, a secondary phase of the over-all invention, but will perhaps be used in most instances. Any simple structure may be employed. That shown is preferred and it comprises a pan-like receiver 42 having a flat bottom 44 and an upstanding endless marginal rim 46. This receiver is preferably of the same outside diameter as the outside diameter of the turntable and the turntable overlies the bottom and serves as a sort of a cover for the receiver. An appropriate hanger bracket 48 is employed and this is attached at 50 to the rim and at the upper end it is laterally bent and attached at 52 to the bottom of the bar. Any suitable refrigerant means may be employed in the receiver. In the drawings, a refrigerating coil of any appropriate construction is shown and this is denoted by the numeral 54.

By attaching the turntable to the bar in the manner shown, the extreme extending shelf-like portion thereof projects some six inches, more or less, beyond the inner edge of the bar. This arrangement makes it possible for the bartender, when mixing drinks, to have handy access to all of the ingredients needed for various drinks. By having the ingredients concentrated in this one spot at the bar, much time will obviously, be saved. It is clear that the turntable will be mounted on the bar at some convenient place so as not to interfere with other fixtures. As stated, two dishes are generally exposed at one time and a slight turn of the table will expose any of the other dishes as desired.

The turntable can be easily made out of wood or stainless steel or commercial plastics, and if the latter material is used, the dishes may be formed as an integral part of the turntable. Since the turntable is removable, it can be washed and cleaned from time to time. Or, when removable dishes are employed, they may be taken out, washed and replenished from time to time.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination, an elongate horizontal bar having an unobstructed lengthwise inner edge providing the usual serving side from which an attendant, a bartender for example, stands and performs his customary duties, a pan-like receiver comprising a bottom and an upstanding circular rim, said receiver being open at its top and provided interiorly with refrigeration means, a hanger bracket secured to the rim and attached to the underside of said bar and supporting said receiver in spaced parallelism beneath the bar, a plate removably affixed to the underneath side of said bar and including a depending screw-threaded socket member, a vertical bolt having a screw-threaded shank and head, the threaded end of the shank being screwed into said socket member, a circular turntable removably and rotatably mounted on the headed end of said bolt, said turntable being of a diameter corresponding to the diameter of the rim of said receiver and the underneath side of the outer marginal edge portion of said turntable resting rotatably on the upper edge of the rim, said turntable being provided with circumferentially spaced openings, and individual dishes removably mounted in their respective openings for handy selective use, said dishes depending into the refrigerated space of said receiver.

2. In combination, an elongate horizontal bar having an unobstructed lengthwise inner edge providing the usual serving side from which an attendant, a bartender for example, stands and performs his customary duties, a pan-like receiver comprising a bottom and an upstanding circular rim, said receiver being open at its top and provided interiorly with refrigeration means, a hanger bracket secured to the rim and attached to the underside of said bar and supporting said receiver in spaced parallelism beneath the bar, a plate removably affixed to the underneath side of said bar and including a depending screw-threaded socket member, a vertical bolt having a screw-threaded shank and head, the threaded end of the shank being screwed into said socket member, a circular turntable removably and rotatably mounted on the headed end of said bolt, said turntable being of a diameter corresponding to the diameter of the rim of said receiver and the underneath side of the outer marginal edge portion of said turntable resting rotatably on the upper edge of the rim, said turntable being provided with circumferentially spaced openings, to accommodate individual insertable and removable dishes.

References Cited in the file of this patent
UNITED STATES PATENTS

| | | |
|---|---|---|
| 102,398 | Hibbs | Apr. 26, 1870 |
| 477,987 | Brandon | June 28, 1892 |
| 721,566 | Hyle | Feb. 24, 1903 |
| 1,570,811 | Wilkinson | Jan. 26, 1926 |
| 2,025,416 | Limerick | Dec. 24, 1935 |